US010779305B2

(12) United States Patent
Zhang et al.

(10) Patent No.: US 10,779,305 B2
(45) Date of Patent: Sep. 15, 2020

(54) RADIO RESOURCE SCHEDULING METHOD AND RELATED DEVICE

(71) Applicant: HUAWEI TECHNOLOGIES CO., LTD., Shenzhen (CN)

(72) Inventors: Jian Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 15/892,881

(22) Filed: Feb. 9, 2018

(65) Prior Publication Data

US 2018/0167960 A1 Jun. 14, 2018

Related U.S. Application Data

(63) Continuation of application No. PCT/CN2016/092728, filed on Aug. 1, 2016.

(30) Foreign Application Priority Data

Aug. 10, 2015 (CN) .......................... 2015 1 0486555

(51) Int. Cl.
*H04W 72/14* (2009.01)
*H04W 72/12* (2009.01)
(Continued)

(52) U.S. Cl.
CPC ......... *H04W 72/1226* (2013.01); *H04L 5/001* (2013.01); *H04W 16/14* (2013.01);
(Continued)

(58) Field of Classification Search
CPC ...... H04L 5/001; H04W 16/14; H04W 28/04; H04W 36/24; H04W 52/146;
(Continued)

(56) References Cited

U.S. PATENT DOCUMENTS

2013/0322375 A1 12/2013 Chang et al.
2015/0092750 A1 4/2015 Huang et al.
(Continued)

FOREIGN PATENT DOCUMENTS

CN 103517355 A 1/2014
CN 104272795 A 1/2015
(Continued)

OTHER PUBLICATIONS

International Search Report in connection with corresponding PCT/CN2016/092728, dated Jan. 8, 2016, 16 pages.
(Continued)

*Primary Examiner* — Phuc H Tran
(74) *Attorney, Agent, or Firm* — Leydig, Voit & Mayer, Ltd.

(57) ABSTRACT

A radio resource scheduling method and a related device are provided. In the method: a terminal determines a channel status of a channel according to at least one of first status information that is of the channel and that is indicated by a secondary eNodeB or second status information that is of the channel and that is obtained by the terminal. The terminal sends, to a master eNodeB, a first notification message configured to indicate the channel status, so that the master eNodeB performs radio resource scheduling for the terminal according to the first notification message. When the secondary eNodeB has not yet performed scheduling for the terminal, the master eNodeB allocates more radio resources to the terminal, and can obtain more chances for allocating a radio resource.

11 Claims, 7 Drawing Sheets

An eNodeB configures, for a terminal, at least one candidate secondary cell used for cross scheduling, where the at least one candidate secondary cell is configured to perform cross scheduling on an uplink radio resource of a secondary cell — 201

When the secondary cell is available, the eNodeB allocates, to the terminal, the uplink radio resource of the secondary cell by using a physical downlink control channel used by the secondary cell or a physical downlink control channel used by the candidate secondary cell — 202

When the secondary cell is unavailable and the candidate secondary cell is available, the eNodeB allocates, to the terminal, the uplink radio resource of the secondary cell by using a physical downlink control channel used by the candidate secondary cell — 203

(51) Int. Cl.

| | |
|---|---|
| ***H04W 16/14*** | (2009.01) |
| ***H04W 36/24*** | (2009.01) |
| ***H04W 72/04*** | (2009.01) |
| ***H04W 28/04*** | (2009.01) |
| ***H04L 5/00*** | (2006.01) |
| ***H04W 52/14*** | (2009.01) |
| ***H04W 52/30*** | (2009.01) |

(52) U.S. Cl.
CPC ........... *H04W 28/04* (2013.01); *H04W 36/24* (2013.01); *H04W 52/146* (2013.01); *H04W 52/30* (2013.01); *H04W 72/04* (2013.01); *H04W 72/0413* (2013.01); *H04W 72/0453* (2013.01); *H04W 72/12* (2013.01)

(58) Field of Classification Search
CPC . H04W 52/30; H04W 72/04; H04W 72/0413; H04W 72/0453; H04W 72/12; H04W 72/1226
See application file for complete search history.

(56) References Cited

U.S. PATENT DOCUMENTS

| | | | | |
|---|---|---|---|---|
| 2015/0131536 | A1 | 5/2015 | Kaur et al. | |
| 2015/0146562 | A1* | 5/2015 | Sivanesan ........... | H04W 72/042 370/252 |
| 2015/0223270 | A1 | 8/2015 | Kim et al. | |
| 2015/0382345 | A1 | 12/2015 | Yamada et al. | |
| 2016/0028532 | A1 | 1/2016 | Yin et al. | |
| 2016/0219604 | A1 | 7/2016 | Fujishiro et al. | |
| 2016/0366616 | A1 | 12/2016 | Wen et al. | |
| 2017/0303288 | A1 | 10/2017 | Li et al. | |
| 2018/0175975 | A1* | 6/2018 | Um ....................... | H04L 1/1816 |

FOREIGN PATENT DOCUMENTS

| | | | |
|---|---|---|---|
| CN | 104540158 | A | 4/2015 |
| CN | 104768160 | A | 7/2015 |
| CN | 104812003 | A | 7/2015 |
| CN | 105050189 | A | 11/2015 |
| JP | 2014-500685 | A | 1/2014 |
| JP | 2014-514787 | A | 6/2014 |
| WO | 2013168828 | A1 | 11/2013 |
| WO | 2015/115573 | A1 | 8/2015 |
| WO | 2015115844 | A1 | 8/2015 |
| WO | 2016121307 | A1 | 8/2016 |

OTHER PUBLICATIONS

Kyocera, "Further consideration of RRM measurement on LAA cell", 3GPP TSG-RAN WG2 #90, R2-152628, Fukuoka, Japan, May 25-29, 2015, 6 pages.

CMCC,"Discussion on HARQ transmission for LAA",3GPP TSG RAN WG1 Ad-hoc Meeting R1-150993, 3GPP, Paris, France, Mar. 24-26, 2015, 4 pages.

* cited by examiner

An eNodeB configures, in a secondary eNodeB, a primary secondary cell and at least one secondary cell for a terminal, so that the terminal decodes downlink data received by the primary secondary cell or one secondary cell to obtain a decoding result; and when it is determined that an uplink radio resource of the primary secondary cell or the secondary cell is available, sends a first message to the eNodeB by using the primary secondary cell or the secondary cell, or when it is determined that an uplink radio resource of the primary secondary cell or the secondary cell is unavailable, sends the first message to the eNodeB by using any secondary cell, different from the unavailable secondary cell, of the at least one secondary cell — 301

The eNodeB determines, according to the first message, whether to retransmit the downlink data or send new downlink data — 302

FIG. 3

A terminal receives downlink data in a primary secondary cell, decodes the downlink data to obtain a decoding result, and sends a first message to an eNodeB in a first time period according to the decoding result, where the first time period includes one of the following: a protocol-predefined short interval, a 1st uplink subframe, and an uplink subframe next to the 1st uplink subframe, where the 1st uplink subframe and the uplink subframe next to the 1st uplink subframe are used for receiving the downlink data in an LTE system — 401

FIG. 4A

PDCCH PDSCH PUCCH

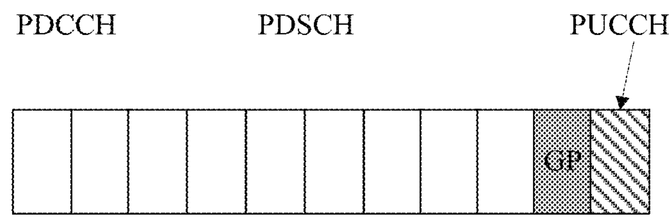

FIG. 4B

RADIO RESOURCE SCHEDULING METHOD AND RELATED DEVICE

CROSS-REFERENCE TO RELATED APPLICATIONS

This application is a continuation of International Application No. PCT/CN2016/092728, filed on Aug. 1, 2016, which claims priority to Chinese Patent Application No. 201510486555.6, filed on Aug. 10, 2015, both of which are hereby incorporated by reference in their entireties.

TECHNICAL FIELD

The present disclosure relates to the field of wireless communications technologies, and in particular, to a radio resource scheduling method and a related device.

BACKGROUND

With rapid development of packet services and intelligent terminals, spectrum requirements of a high-speed and large-data-volume service are increasing, and higher spectrum efficiency needs to be achieved. In a Long Term Evolution Advanced (LTE-A) system, an LTE-A cellular communications technology is applied to an unlicensed spectrum by means of licensed-assisted access (LAA), to improve utilization of an unlicensed spectrum resource and increase available spectrum bandwidth of an LTE user. The unlicensed spectrum includes a frequency band for devices used in industry, science, and medical applications and the like. LAA means a scenario of carrier aggregation (CA) based on a licensed spectrum and an unlicensed spectrum. A carrier on a licensed spectrum is used for a primary serving cell (PCell), and a carrier on an unlicensed spectrum is used for a secondary cell (SCell). The PCell is a cell in which user equipment (UE) is located when the user equipment initially accesses a system in a random access process or a cell in which user equipment is located when the user equipment accesses a target eNodeB in a handover process. The PCell can provide security and non-access stratum (NAS) signaling transmission. The SCell mainly provides an additional radio resource for data transmission.

In the prior art, an LTE-A dual connectivity (DC) technology is introduced, so that different eNodeBs provide carriers required when CA is performed to UE, and the UE can perform communication with two eNodeBs simultaneously or non-simultaneously. This can increase a peak rate and a throughput at a cell edge to some extent.

However, in the prior art, it is not supported that a primary secondary cell (PSCell) served by a secondary eNodeB (SeNB) uses a carrier on an unlicensed spectrum in the LTE-A DC scenario.

SUMMARY

The present disclosure provides a radio resource scheduling method and a related device, so as to resolve a problem that radio resource scheduling cannot be performed when a PSCell served by a SeNB uses a carrier on an unlicensed spectrum in an LTE-A DC scenario.

A first aspect of the present disclosure provides a radio resource scheduling method, where the method is applied to unlicensed spectrum-based radio communication, and the method includes:

determining, by a terminal, a channel status of a channel according to at least one of first status information that is of the channel and that is indicated by a secondary eNodeB or second status information that is of the channel and that is obtained by the terminal, and sending, to a master eNodeB, a first notification message configured to indicate the channel status, so that the master eNodeB performs radio resource scheduling for the terminal according to the first notification message.

A second aspect of the present disclosure provides a radio resource scheduling method, where the method is applied to unlicensed spectrum-based radio communication, and the method includes:

configuring, for a terminal by an eNodeB, at least one candidate secondary cell used for cross scheduling, where the at least one candidate secondary cell is configured to perform cross scheduling on an uplink radio resource of a secondary cell; and when the secondary cell is available, allocating, by the eNodeB to the terminal, the uplink radio resource of the secondary cell by using a physical downlink control channel used by the secondary cell or a physical downlink control channel used by the candidate secondary cell; or when the secondary cell is unavailable and the candidate secondary cell is available, allocating, by the eNodeB to the terminal, the uplink radio resource of the secondary cell by using a physical downlink control channel used by the candidate secondary cell.

A third aspect of the present disclosure provides a hybrid automatic repeat request management method, where the method is applied to unlicensed spectrum-based radio communication, and the method includes:

configuring, in a secondary eNodeB by an eNodeB, a primary secondary cell and at least one secondary cell for a terminal, so that the terminal decodes downlink data received by the primary secondary cell or any secondary cell to obtain a decoding result; and when it is determined that an uplink radio resource of the primary secondary cell or the secondary cell is available, sending a first message to the eNodeB by using the primary secondary cell or the secondary cell, or when it is determined that an uplink radio resource of the primary secondary cell or the secondary cell is unavailable, sending the first message to the eNodeB by using any secondary cell, different from the unavailable secondary cell, of the at least one secondary cell; and determining, by the eNodeB according to the first message, whether to retransmit the downlink data or send new downlink data.

A fourth aspect of the present disclosure provides a hybrid automatic repeat request feedback method, where the method is applied to unlicensed spectrum-based radio communication, and the method includes:

receiving, by a terminal, downlink data in a primary secondary cell, decoding the downlink data to obtain a decoding result, and sending a first message to an eNodeB in a first time period according to the decoding result, so that the eNodeB determines, according to the first message, whether to retransmit the downlink data or send new downlink data, where when the decoding result indicates that decoding succeeds, the first message includes an acknowledgement ACK message, or when the decoding result indicates that decoding fails, the first message includes an NACK message, and the first time period includes one of the following:

a protocol-predefined short interval, a $1^{st}$ first uplink OFDM symbol that is not occupied, a first uplink subframe, or a $1^{st}$ second uplink subframe that is not occupied and that follows the first uplink subframe, where the $1^{st}$ first uplink OFDM symbol, the first uplink subframe, and the $1^{st}$ second uplink subframe are used for receiving the downlink data in an LTE system, a subframe in which the terminal receives the downlink data and the protocol-predefined short interval are in a same subframe, and the first uplink subframe is in the first downlink subframe following the downlink subframe in which the terminal receives the data.

A fifth aspect of the present disclosure provides a terminal, where the terminal is applied to unlicensed spectrum-based radio communication, and the terminal includes:

a processing module, configured to determine a current channel contention result according to at least one of first status information indicating whether a secondary eNodeB successfully contends for a channel or second status information indicating whether the terminal successfully contends for the channel; and a transmission module, configured to send, to a master eNodeB, a first notification message configured to indicate the channel contention result that is determined by the processing module, so that the master eNodeB performs radio resource scheduling for the terminal according to the first notification message.

A sixth aspect of the present disclosure provides an eNodeB, where the eNodeB is applied to unlicensed spectrum-based radio communication, and the eNodeB includes:

a processing module, configured to configure, for a terminal, at least one candidate secondary cell used for cross scheduling, where the at least one candidate secondary cell is configured to perform cross scheduling on an uplink radio resource of a secondary cell; and when the secondary cell is available, allocate, to the terminal, the uplink radio resource of the secondary cell by using a physical downlink control channel used by the secondary cell or a physical downlink control channel used by the candidate secondary cell; or when the secondary cell is unavailable and the candidate secondary cell is available, allocate, to the terminal, the uplink radio resource of the secondary cell by using a physical downlink control channel used by the candidate secondary cell.

A seventh aspect of the present disclosure provides an eNodeB, where the eNodeB is applied to unlicensed spectrum-based radio communication, and the eNodeB includes:

a processing module, configured to: configure, in a secondary eNodeB, a primary secondary cell and at least one secondary cell for a terminal, so that the terminal decodes downlink data received by the primary secondary cell or any secondary cell to obtain a decoding result; and when it is determined that an uplink radio resource of the primary secondary cell or the secondary cell is available, send a first message to the eNodeB by using the primary secondary cell or the secondary cell, or when it is determined that an uplink radio resource of the primary secondary cell or the secondary cell is unavailable, send the first message to the eNodeB by using any secondary cell, different from the unavailable secondary cell, of the at least one secondary cell; and determine, according to the first message, whether to retransmit the downlink data or send new downlink data.

An eighth aspect of the present disclosure provides a terminal, where the terminal is applied to unlicensed spectrum-based radio communication, and the terminal includes:

a processing module, configured to: receive downlink data in a primary secondary cell, and decode the downlink data to obtain a decoding result; and a transmission module, configured to: send a first message to an eNodeB in a first time period according to the decoding result obtained by the processing module, so that the eNodeB determines, according to the first message, whether to retransmit the downlink data or send new downlink data, where when the decoding result indicates that decoding succeeds, the first message includes an acknowledgement ACK message, or when the decoding result indicates that decoding fails, the first message includes an NACK message, and the first time period includes one of the following:

a protocol-predefined short interval, a $1^{st}$ first uplink OFDM symbol that is not occupied, a first uplink subframe, or a $1^{st}$ second uplink subframe that is not occupied and that follows the first uplink subframe, where the $1^{st}$ first uplink OFDM symbol, the first uplink subframe, and the $1^{st}$ second uplink subframe are used for receiving the downlink data in an LTE system, and a subframe in which the terminal receives the downlink data and the protocol-predefined short interval are in a same subframe, and the first uplink subframe is in the first downlink subframe following the downlink subframe in which the terminal receives the data.

It can be learned from the foregoing technical solutions that, in the present disclosure, the terminal reports, to the master eNodeB, a channel contention result obtained after the terminal and the secondary eNodeB contend for a channel, so that the master eNodeB allocates more radio resources to the terminal when the secondary eNodeB has not yet performed scheduling for the terminal, and can obtain more chances for allocating a radio resource. This effectively improves radio resource utilization to some extent.

BRIEF DESCRIPTION OF DRAWINGS

FIG. 3 is another schematic flowchart of a radio resource scheduling method according to an aspect;

FIG. 4A is a schematic flowchart of hybrid automatic repeat request management method according to an aspect;

FIG. 4B is a structural diagram of a subframe that is configured to feed back a first message according to an aspect;

DESCRIPTION OF EMBODIMENTS

Figure 1:
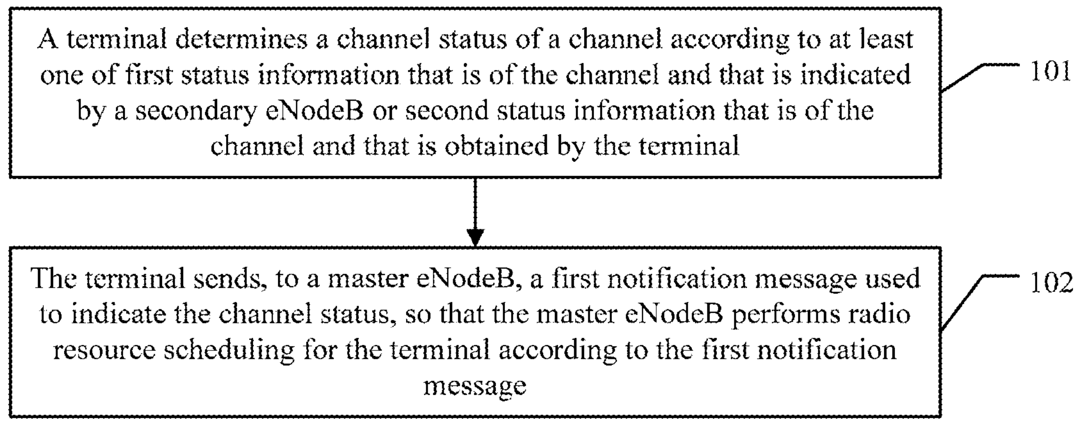
FIG. 1 is a schematic flowchart of a radio resource scheduling method according to an aspect.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In this specification, claims, and the accompanying drawings of the present disclosure, the terms "first", "second", and so on are intended to distinguish between similar objects but do not necessarily indicate a specific order or sequence. It should be understood that the data termed in such a way are interchangeable in proper circumstances so that the embodiments described herein can be implemented in an order other than the order illustrated or described herein. Moreover, the terms "include", "comprise", and any other variants mean to cover the non-exclusive inclusion, for example, a process, method, system, product, or device that includes a list of steps or modules is not necessarily limited to those modules, but may include other modules not expressly listed or inherent to such a process, method, product, or device. The module division in this specification is merely logical division and may be other division in actual implementation. For example, a plurality of modules may be combined or integrated into another system, or some features may be ignored or not performed. In addition, the displayed or discussed mutual couplings or direct couplings or communication connections may be indirect couplings or communication connections between some interfaces or modules, and may be implemented in electrical or other similar forms. This is not limited in this specification. In addition, modules or submodules used as separate components may be or may not be separated physically, may be or may not be physical modules, and may be distributed in different circuit modules. Some or all modules may be selected according to an actual requirement to implement the purpose of the solution of the embodiments of the present disclosure.

The embodiments of the present disclosure provide a radio resource scheduling method and a related device, to be used for unlicensed spectrum-based radio communication (for example, Long Term Evolution Advanced network-dual connectivity LTE-DC), and to resolve a problem that radio resource scheduling cannot be performed when a PSCell served by an SeNB uses a carrier on an unlicensed spectrum in an LTE-A DC scenario.

In an existing DC technology, a MeNB divides, according to a proportion, two UE parameters included in limit information that is used by an SeNB to perform scheduling for UE, to obtain division information, and sends the division information to the SeNB. The two UE parameters are a maximum quantity of downlink shared channel (DL-SCH) transport block bits that are received in a unit transmission time interval (TTI) and a maximum quantity of uplink shared channel (UL-SCH) transport block bits that are sent in a unit TTI. Correspondingly, the MeNB uses limit information of a proportion obtained by means of division by the MeNB, as the limit information for performing scheduling for the UE by the MeNB.

When a PSCell served by the SeNB is an unlicensed spectrum, an availability status of a radio resource of the PSCell is determined according to a result obtained after an eNB and/or the UE contend/contends for a channel by means of listen before talk (LBT).

1. When a channel used by the PSCell is occupied by LTE, the SeNB may send downlink data to the UE and/or the UE may send uplink data to the SeNB; and the SeNB uses the division information as limit information for performing scheduling for the UE, and allocates a radio resource to the UE.

2. When a channel used by the PSCell is not occupied by LTE, the SeNB cannot send downlink data to the UE and/or the UE cannot send uplink data to the SeNB. In this case, the MeNB may use all capabilities corresponding to the two UE parameters to perform scheduling for the UE, instead of using the division information as limit information for performing scheduling for the UE.

It can be learned from cases 1 and 2 that, when the PSCell served by the SeNB is the unlicensed spectrum, the MeNB needs to determine, according to the result obtained after the eNB and the UE contend for the channel, whether the MeNB needs to use the division information as the limit information for performing scheduling for the UE. This fully uses an idle resource existing when the SeNB cannot perform scheduling for the UE, so that the UE can obtain radio resources as many as possible.

Referring to FIG. 1, the following describes a radio resource scheduling method according to an aspect of the present disclosure from a perspective of reporting a notification message to an eNodeB on a terminal side. The method is applied to unlicensed spectrum-based radio communication, and this embodiment of the present disclosure includes the following steps.

101. A terminal determines a channel status of a channel according to at least one of first status information of the channel and second status information of the channel, where the first status information of the channel is indicated by a secondary eNodeB, and where the second status information of the channel is obtained by the terminal.

For example, the first status information may include a result obtained after the secondary eNodeB contends for a channel or releases a channel. The first status information may be channel occupancy indication information preamble that is sent by the secondary eNodeB to the terminal, or LTE feature information that is directly sent by the secondary eNodeB, for example, a CRS. In addition, the terminal may determine the channel status of the channel according to preconfigured duration information of channel occupancy or channel releasing in combination with the first status information.

The second status information may include a result obtained after the terminal contends for or releases a channel. The terminal may determine the channel contention result according to information that is sent over a radio interface by the secondary eNodeB, to obtain the channel status. For example, after the secondary eNodeB successfully contends for the channel, the secondary eNodeB sends preamble information or a reference signal over the radio interface.

102. The terminal sends, to a master eNodeB, a first notification message configured to indicate the channel status, so that the master eNodeB performs radio resource scheduling for the terminal according to the first notification message.

After receiving the channel status fed back by the terminal, the master eNodeB may determine, according to the first notification message, whether to use division information as limit information for performing scheduling for the UE, and may allocate radio resources to the terminal as many as possible when the secondary eNodeB has not yet performed scheduling for the terminal.

Generally, the secondary eNodeB transmits information about the channel contention result to the master eNodeB by using an X2 interface between the secondary eNodeB and the master eNodeB, which may cause a relatively long delay. Therefore, when there is no ideal backhaul link condition, the X2 interface may not be a good choice to send the information about the channel contention result. In this case, a radio interface between the terminal and the master eNodeB may be preferentially selected to send the first notification message to the master eNodeB, so that a transmission delay of the first notification message can be effectively reduced.

In some embodiments of the present disclosure, the terminal reports, to the master eNodeB, the channel contention result obtained after the terminal and the secondary eNodeB contend for the channel, so that the master eNodeB allocates more radio resources to the terminal when the secondary eNodeB has not yet performed scheduling for the terminal, and can obtain more chances for allocating a radio resource. This effectively improves radio resource utilization to some extent.

Additionally or alternatively, based on the example corresponding to FIG. 1, in a first optional embodiment of this embodiment of the present disclosure, the first notification message is further configured to indicate first duration of channel occupancy and/or second duration of channel releasing, so that the master eNodeB allocates a radio resource to the terminal within the first duration and/or the second duration according to the first duration and/or the second duration; or the first notification message is further configured to indicate whether the channel is occupied and whether the channel is released, so that the master eNodeB allocates a radio resource to the terminal according to an indication of the first notification message before receiving a next notification message that is sent by the terminal.

It can be understood that, the first duration or the second duration may be preconfigured. The first duration may alternatively be maximum preconfigured duration that is of channel occupancy and that is sent by the master eNodeB to the secondary eNodeB by using the X2 interface, and the second duration may alternatively be maximum preconfigured duration that is of channel releasing and that is sent by the master eNodeB to the secondary eNodeB by using the X2 interface.

Additionally or alternatively, based on the embodiment corresponding to FIG. 1 or the first optional embodiment, in a second optional embodiment of this embodiment of the present disclosure, the method further includes:

sending, by the terminal, first uplink data to the master eNodeB according to a first power, where the first power is a power limit that is configured by the master eNodeB for the terminal to send the first uplink data; and/or sending, by the terminal, second uplink data to the secondary eNodeB according to a second power, where the second power is a power limit that is configured by the secondary eNodeB for the terminal to send the second uplink data, and a sum of the first power and the second power is not greater than a maximum transmit power of the terminal, the terminal may alternatively send uplink data to the secondary eNodeB, and in addition, powers used by the terminal to send uplink data to the master eNodeB or the secondary eNodeB may be the same or different.

The method further includes:

sending, by the terminal, third uplink data according to a third power or sending fourth uplink data according to a fourth power; when the third power is a residual power that is determined according to the first power and the second power, sending, by the terminal, the third uplink data to the master eNodeB according to the first power and a part of or all of the residual power; and when the fourth power is a residual power that is determined according to the first power and the second power, sending, by the terminal, the fourth uplink data to the secondary eNodeB according to the second power and a part of or all of the residual power; or sending, by the terminal, a second notification message to the master eNodeB, where the second notification message is configured to indicate whether a channel used by a primary secondary cell is available, so that when determining, according to the second notification message, that the channel used by the primary secondary cell is unavailable, the master eNodeB allocates a radio resource to the terminal by using all the uplink powers of the terminal, or when determining that the channel used by the primary secondary cell is available, the master eNodeB allocates a radio resource to the terminal according to the first power, or the first power and the residual power.

The second notification message may be sent by using the residual power.

When the terminal sends the first uplink data or the second uplink data, the residual power may be used only by the master eNodeB or the secondary eNodeB, or after division is performed on the residual power, the master eNodeB or the secondary eNodeB may use a residual power of a respective proportion obtained by means of division of the residual power.

Additionally or alternatively, based on the second optional embodiment, in a third optional embodiment of this embodiment of the present disclosure, a capability parameter of the terminal includes limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, where the limit information is allocated by the master eNodeB and the secondary eNodeB.

The method further includes one of the following cases:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, where all capabilities corresponding to the capability parameter of the terminal are used by the master eNodeB to perform scheduling for the terminal.

It can be understood that, a sum of the limit information allocated by the master eNodeB and the limit information allocated by the secondary eNodeB is equal to the capability parameter of the terminal.

Additionally or alternatively, based on any one of the embodiment corresponding to FIG. 1 or the first to the third optional embodiments, in a fourth optional embodiment of this embodiment of the present disclosure, the method further includes at least one of the following steps:

when it is determined that an uplink radio resource of the primary secondary cell is unavailable, sending, by the terminal, a third notification message to the master eNodeB, so that the master eNodeB forwards, to the secondary eNodeB, content carried in the third notification message, and the secondary eNodeB performs radio resource scheduling for the terminal, where the third notification message carries a buffer status report (BSR) and a power headroom report (PHR) that are related to the secondary eNodeB, and in addition, the terminal may identify the BSR and the PHR by using an eNodeB identifier or a cell group identifier, to indicate whether corresponding information is sent to the SeNB or an MeNB, and this is not specifically limited; or when it is determined that an uplink radio resource of the primary secondary cell is unavailable, sending, by the terminal, a fifth notification message to the master eNodeB, so that the master eNodeB forwards, to the secondary eNodeB, content carried in the fifth notification message, and the secondary eNodeB performs radio resource scheduling for the terminal, where the fifth notification message carries a RLC status report that is corresponding to the secondary eNodeB and that is related to a data radio bearer (DRB), and the terminal may identify the RLC status report, to indicate whether corresponding information is sent to the SeNB or the MeNB, and this is not specifically limited.

According to this optional embodiment, the terminal may send the BSR/PHR/RLC to the master eNodeB in a timely manner, so that a delay required when the master eNodeB learns that an uplink radio resource of the primary secondary cell is unavailable is reduced, and the master eNodeB may allocate a new available uplink radio resource to the terminal in a timely manner according to the three status reports. Therefore, it can be ensured that the terminal sends uplink data, and the master eNodeB obtains more chances for allocating a radio resource to the terminal.

Figure 2:
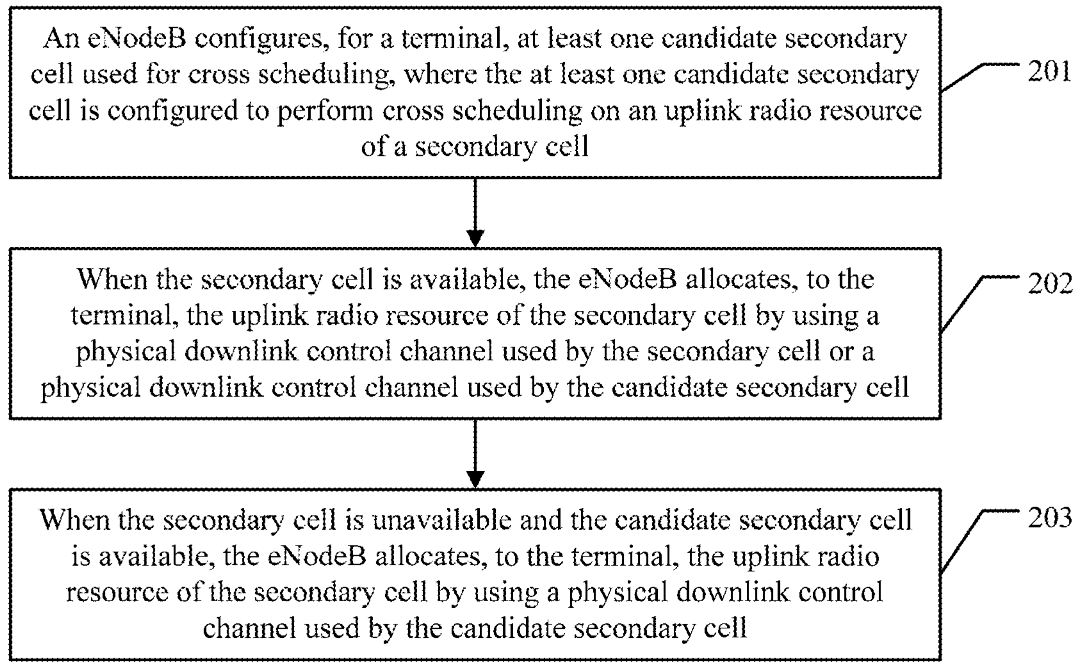
FIG. 2 is another schematic flowchart of a radio resource scheduling method according to an aspect.

Referring to FIG. 2, the following uses an example to describe a radio resource scheduling method according to an aspect of the present disclosure from a perspective of scheduling a radio resource for a terminal by an eNodeB. The method is applied to unlicensed spectrum-based radio communication, and this embodiment of the present disclosure includes the following steps.

201. An eNodeB configures, for a terminal, at least one candidate secondary cell used for cross scheduling, where the at least one candidate secondary cell is configured to perform cross scheduling on an uplink radio resource of a secondary cell.

202. When the secondary cell is available, the eNodeB allocates, to the terminal, the uplink radio resource of the secondary cell by using a physical downlink control channel used by the secondary cell or a physical downlink control channel used by the candidate secondary cell.

203. When the secondary cell is unavailable and the candidate secondary cell is available, the eNodeB allocates, to the terminal, the uplink radio resource of the secondary cell by using a physical downlink control channel used by the candidate secondary cell.

In this embodiment of the present disclosure, the eNodeB configures, for the terminal, the at least one candidate secondary cell used for cross scheduling; and when the secondary cell provided by the eNodeB is available, the eNodeB allocates, to the terminal, the uplink radio resource of the secondary cell by using the physical downlink control channel used by the secondary cell; or when the secondary cell provided by the eNodeB is unavailable, the eNodeB allocates, to the terminal, the uplink radio resource of the secondary cell by using the physical downlink control channel used by the candidate secondary cell, so as to obtain more chances for allocating an uplink radio resource to the terminal. This can improve a throughput and radio resource utilization.

Additionally or alternatively, based on the embodiment corresponding to FIG. 2, in a first optional embodiment of this embodiment of the present disclosure, the method further includes:

configuring, by the eNodeB, a priority for each candidate secondary cell, where a priority of the secondary cell is higher than the priority of each candidate secondary cell, or a priority of the secondary cell is lower than a priority of the at least one candidate secondary cell; and the allocating, by the eNodeB to the terminal, the uplink radio resource of the secondary cell by using a physical downlink control channel used by the candidate secondary cell, when the secondary cell is unavailable, includes:

when the secondary cell is unavailable, selecting, by the eNodeB in descending order of priorities of candidate secondary cells, a target candidate secondary cell with a highest priority from candidate secondary cells whose current radio resources are available, and allocating, to the terminal, the uplink radio resource of the secondary cell by using a physical downlink control channel used by the target candidate secondary cell.

Additionally or alternatively, the allocating, by the eNodeB to the terminal, the uplink radio resource of the secondary cell by using a physical downlink control channel used by the secondary cell, when the secondary cell is available, includes:

allocating, by the eNodeB to the terminal, the uplink radio resource of the secondary cell by using the physical downlink control channel used by the secondary cell, so that the terminal sends uplink data on a physical uplink shared control channel by using the uplink radio resource.

Additionally or alternatively, based on the first optional embodiment, in a second optional embodiment of this embodiment of the present disclosure, the method further includes:

sending, by the eNodeB, an indication message to the terminal, where the indication message is configured to indicate whether the secondary cell is in an available state, so that the terminal monitors, in a secondary cell in an available state according to the indication message and the priority order, the physical downlink control channel that is configured to allocate the uplink radio resource of the secondary cell.

In an actual application, when carrier load on an unlicensed spectrum is relatively heavy, the secondary eNodeB is prone to unsuccessfully contend for a channel, and further fails to transmit downlink data. In addition, an SGW cannot learn whether a primary secondary cell or a secondary cell provided by the secondary eNodeB is available. In this case, if the serving gateway SGW still keeps sending data to the secondary eNodeB, a buffer shortage of the secondary eNodeB may be caused, further resulting in a data packet loss. To some extent, an S1-U interface transmission resource is not fully used, consequently, a waste is caused and an idle transmission resource is not fully used. To resolve this problem, flow control information is usually introduced between the secondary eNodeB and the SGW, and the secondary eNodeB periodically sends an indication message to the SGW, and a specific implementation is as follows:

sending, by the secondary eNodeB, a first indication message to the serving gateway SGW periodically or according to channel availability status information of a cell, so that the serving gateway determines a transmission rate according to the first indication message, and sends the downlink data to the secondary eNodeB at the transmission rate.

Further, the implementation may further include:

sending, by the secondary eNodeB, a second indication message to the serving gateway, so that the serving gateway adjusts, according to the second indication message, the transmission rate used for sending the downlink data, where the second indication message includes at least one of buffer allocation information of each terminal or buffer information of each data radio bearer.

Additionally or alternatively, a relationship between a transmission rate and channel quality may be preconfigured. For example, when a channel condition is relatively poor, the downlink data is sent at a relatively low transmission rate; otherwise, the downlink data is sent at a relatively high transmission rate. An increase or decrease of the transmission rate is specifically set according to actual channel quality. This is not limited in this specification.

According to the implementation, the SGW can learn, in real time, availability status information of a channel used by each cell provided by the secondary eNodeB, and determine, according to the availability status information, the transmission rate used for sending the downlink data to the secondary eNodeB. This can effectively avoid a problem that a data packet loss is caused due to a buffer shortage of the secondary eNodeB when channel quality is poor, so that data can be transmitted normally. In addition, data transmission reliability and radio resource utilization are improved to some extent.

In the foregoing, radio resource utilization is improved by scheduling an idle radio resource. The following describes a hybrid automatic repeat request management method according to an aspect of the present disclosure from a perspective of improving a data transmission throughput. The method is applied to unlicensed spectrum-based radio communication. Referring to FIG. 3, this embodiment of the present disclosure includes the following steps.

301. An eNodeB configures, in a secondary eNodeB, a primary secondary cell and at least one secondary cell for a terminal, so that the terminal decodes downlink data received by the primary secondary cell or one secondary cell to obtain a decoding result; and when it is determined that an uplink radio resource of the primary secondary cell or the secondary cell is available, sends a first message to the eNodeB by using the primary secondary cell or the secondary cell, or when it is determined that an uplink radio resource of the primary secondary cell or the secondary cell is unavailable, sends the first message to the eNodeB by using any secondary cell, different from the unavailable secondary cell, of the at least one secondary cell.

It can be understood that, a specific manner of determining, by the terminal, whether the uplink radio resource of the secondary cell is available includes:

when detecting, by means of LBT, that a PUCCH or a PUSCH used by the secondary cell is not occupied by another device, or when the eNodeB occupies the PUCCH and the PUSCH in advance and the eNodeB is still in valid channel occupancy duration, determining, by the terminal, that the uplink ratio resource of the secondary cell is available; otherwise, the uplink radio resource of the secondary cell is unavailable.

302. The eNodeB determines, according to the first message, whether to retransmit the downlink data or send new downlink data.

In this embodiment of the present disclosure, the eNodeB configures the primary secondary cell and the at least one secondary cell for the terminal, so that the terminal decodes the downlink data received by the primary secondary cell; and when the uplink radio resource of the secondary cell is available, sends the first message to the eNodeB by using the secondary cell; or when the uplink radio resource of the secondary cell is unavailable, sends the first message to the eNodeB by using the candidate secondary cell. This can effectively avoid the following problem: When an unlicensed spectrum is used in the prior art, the eNodeB has not received, for a long time, the first message fed back by the terminal because an uplink radio resource of the secondary cell is unavailable, and therefore the eNodeB cannot determine whether to perform retransmission or to transmit new data.

Additionally or alternatively, based on the embodiment corresponding to FIG. 3, in a first optional embodiment of this embodiment of the present disclosure, when there are a plurality of secondary cells, the method further includes:

configuring, by the eNodeB, priorities for the primary secondary cell and each secondary cell, so that the terminal selects, in descending order of the priorities of the primary secondary cell and the secondary cell, a cell with a highest priority from the primary secondary cell or the secondary cell whose current radio resource is available, to send the first message, where it can be understood that, in this specification, both the primary secondary cell and the secondary cell are cells, and an only difference lies whether a cell is a primary cell or a secondary cell.

Additionally or alternatively, based on the embodiment corresponding to FIG. 3 or the first optional embodiment, in a second optional embodiment of this embodiment of the present disclosure, the method further includes one of the following cases:

the eNodeB configures a same primary secondary cell and a plurality of secondary cells for different terminals, where a same priority is configured for the secondary cells of the different terminals;

the eNodeB configures a same primary secondary cell and a plurality of secondary cells for different terminals, where different priorities are configured for the secondary cells of the different terminals;

the eNodeB configures different primary secondary cells and a plurality of secondary cells for different terminals, where a same priority is configured for the secondary cells of the different terminals; or the eNodeB configures different primary secondary cells and a plurality of secondary cells for different terminals, where different priorities are configured for the secondary cells of the different terminals.

Additionally or alternatively, based on the embodiment corresponding to FIG. 3 or the first or the second optional embodiment, in a third optional embodiment of this embodiment of the present disclosure, the method further includes:

receiving, by the eNodeB, the first message on a physical uplink control channel (PUCCH) or a physical uplink shared channel (PUSCH) corresponding to a physical downlink shared channel (PDSCH) on which the downlink data is sent; or when the first message is not detected on the radio resource corresponding to the PUCCH or the PUSCH, sequentially detecting, by the eNodeB, the first message in descending order of priorities of candidate secondary cells; or when the first message is a message sent by the terminal by using a channel (the PUCCH or the PUSCH) used by a candidate secondary cell, detecting, by the eNodeB according to a processing mode of carrier aggregation CA, a channel on which the first message is sent, so that a PDSCH corresponding to a specific secondary cell for transmission of the first message can be identified accurately.

The following describes a hybrid automatic repeat request feedback method according to an aspect of the present disclosure from a perspective of sending feedback information by a terminal to an eNodeB. The method is applied to unlicensed spectrum-based radio communication. Referring to FIG. 4A, this embodiment of the present disclosure includes the following steps.

401. A terminal receives downlink data in a primary secondary cell, decodes the downlink data to obtain a decoding result, and sends a first message to an eNodeB in a first time period according to the decoding result, so that the eNodeB determines, according to the first message, whether to retransmit the downlink data or send new downlink data.

When the decoding result indicates that decoding succeeds, the first message includes an acknowledgement ACK message; when the decoding result indicates that decoding fails, the first message includes an NACK message. The first time period includes one of the following:

a protocol-predefined short interval, a $1^{st}$ first uplink orthogonal frequency division multiplexing (OFDM) symbol that is not occupied, a first uplink subframe, or a $1^{st}$ second uplink subframe that is not occupied and that follows the first uplink subframe, where the $1^{st}$ first uplink OFDM symbol, the first uplink subframe, and the $1^{st}$ second uplink subframe are used for receiving the downlink data in an LTE system, and a subframe in which the terminal receives the downlink data and the protocol-predefined short interval are in a same subframe, and the first uplink subframe is in the first downlink subframe following the downlink subframe in which the terminal receives the data.

Figure 4C:
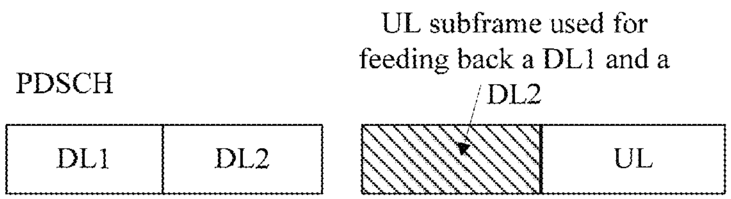
FIG. 4C is another structural diagram of a subframe that is configured to feed back a first message according to an aspect.
Figure 4D:
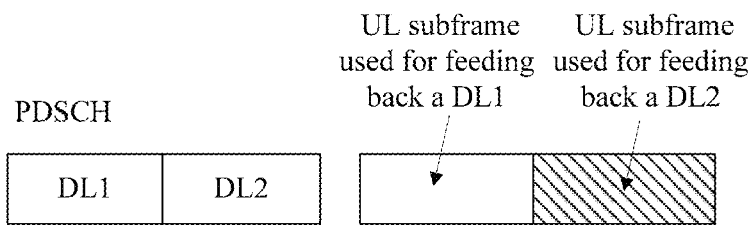
FIG. 4D is another structural diagram of a subframe that is configured to feed back a first message according to an aspect.

A structure of the protocol-predefined short interval is shown in FIG. 4B. GP indicates a guard period (GP). A structure of the first uplink subframe is shown in FIG. 4C, and a structure of the second uplink subframe is shown in FIG. 4D.

In this embodiment of the present disclosure, after decoding the downlink data received by the primary secondary cell, the terminal sends the first message to the eNodeB in the first time period according to the decoding result. This can effectively avoid the following problem: When an unlicensed spectrum is used in the prior art, the first message cannot be fed back in a timely manner because a feedback time period is relatively long and is a fixed configuration, and in this case, because the eNodeB has not received a feedback from the terminal for a long time, the eNodeB cannot determine whether to perform retransmission or transmit new data.

Additionally or alternatively, based on the embodiment corresponding to FIG. 4A, in a first optional embodiment of this embodiment of the present disclosure, the first message is a signaling message that is sent to the eNodeB by the terminal in the first time period by using any one of the following:

a PUCCH of the primary secondary cell or a PUSCH of the primary secondary cell; or the first message is a signaling message that is sent by the terminal in descending order of priorities of candidate secondary cells by using a candidate secondary cell with a highest priority from candidate secondary cells whose current radio resources are available. Additionally or alternatively, the priorities of the candidate secondary cells are configured by the eNodeB for the terminal.

Additionally or alternatively, based on the first optional embodiment, in a second optional embodiment of this embodiment of the present disclosure, before the first time period, the method further includes:

sending, by the terminal, a reference signal to the eNodeB or sending a MAC layer data packet including a channel reservation time to the eNodeB, to occupy the PUCCH or the PUSCH, so as to reach maximum channel occupancy duration. This avoids some interference to sending the first message by the terminal when the PUCCH or the PUSCH is occupied by another device.

Additionally or alternatively, based on the embodiment corresponding to FIG. 4A or the first or the second optional embodiment, in a third optional embodiment of the present disclosure, after the maximum channel occupancy duration expires, when an uplink radio resource of the secondary cell is unavailable or when a radio resource occupied by the terminal is unavailable, and when the terminal has not yet sent the first message to the eNodeB, the method further includes:

after re-occupying the PUCCH or the PUSCH, determining, by the terminal according to maximum duration for sending the first message, whether to send the first message again.

Figure 5:
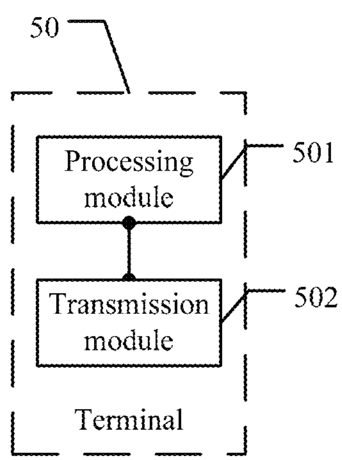
FIG. 5 is a schematic structural diagram of a terminal according to an aspect.

Referring to FIG. 5, a terminal 50 in an aspect of the present disclosure is described. The terminal 50 is applied to unlicensed spectrum-based radio communication, and the terminal 50 includes:

a processing module 501, configured to determine a channel status of a channel according to at least one of first status information that is of the channel and that is indicated by a secondary eNodeB or second status information that is of the channel and that is obtained by the terminal 50; and a transmission module 502, configured to send, to a master eNodeB, a first notification message configured to indicate the channel status that is determined by the processing module, so that the master eNodeB performs radio resource scheduling for the terminal according to the first notification message.

In this embodiment of the present disclosure, the terminal 50 reports the channel status to the master eNodeB by using the transmission module 502, so that the master eNodeB allocates more radio resources to the terminal when the secondary eNodeB has not yet performed scheduling for the terminal, and can obtain more chances for allocating a radio resource. This improves radio resource utilization effectively to some extent.

Additionally or alternatively, based on the embodiment corresponding to FIG. 5, in a first optional embodiment of this embodiment of the present disclosure, the first notification message is further configured to indicate first duration of channel occupancy and/or second duration of channel releasing, so that the master eNodeB allocates a radio resource to the terminal 50 within the first duration and/or the second duration according to the first duration and/or the second duration; or the first notification message is further configured to indicate whether the channel is occupied and whether the channel is released, so that the master eNodeB allocates a radio resource to the terminal 50 according to an indication of the first notification message before receiving a next notification message that is sent by the terminal 50.

Additionally or alternatively, based on the embodiment corresponding to FIG. 5 or the first optional embodiment, in a second optional embodiment of this embodiment of the present disclosure, the transmission module 502 is further configured to:

send first uplink data to the master eNodeB according to a first power, where the first power is a power limit that is configured by the master eNodeB for the terminal 50 to send the first uplink data; and/or send second uplink data to the secondary eNodeB according to a second power, where the second power is a power limit that is configured by the secondary eNodeB for the terminal 50 to send the second uplink data, and a sum of the first power and the second power is not greater than a maximum transmit power of the terminal.

The transmission module 502 is further configured to:

send third uplink data according to a third power or send fourth uplink data according to a fourth power; when the third power is a residual power that is determined according to the first power and the second power, send the third uplink data to the master eNodeB according to the first power and a part of or all of the residual power; and when the fourth power is a residual power that is determined according to the first power and the second power, send the fourth uplink data to the secondary eNodeB according to the second power and a part of or all of the residual power; or send a second notification message to the master eNodeB, where the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal 50 according to the first power, or the first power and the residual power.

Additionally or alternatively, based on the second optional embodiment, in a third optional embodiment of this embodiment of the present disclosure, a capability parameter of the terminal includes limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, where the limit information is allocated by the master eNodeB and the secondary eNodeB.

The transmission module is further configured to execute one of the following cases:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, where all capabilities corresponding to the capability parameter of the terminal are used by the master eNodeB to perform scheduling for the terminal.

Additionally or alternatively, based on the embodiment corresponding to FIG. 5 or the first to the third optional embodiments, in a fourth optional embodiment of this embodiment of the present disclosure, the transmission module 502 is further configured to perform at least one of the following steps:

when it is determined that an uplink radio resource of the primary secondary cell is unavailable, sending a third notification message to the master eNodeB, so that the master eNodeB forwards, to the secondary eNodeB, content carried in the third notification message, and the secondary eNodeB performs radio resource scheduling for the terminal, where the third notification message carries a buffer status report BSR and a power headroom report PHR that are related to the secondary eNodeB; or when it is determined that an uplink radio resource of the primary secondary cell is unavailable, sending a fifth notification message to the master eNodeB, so that the master eNodeB forwards, to the secondary eNodeB, content carried in the fifth notification message, and the secondary eNodeB performs radio resource scheduling for the terminal 50, where the fifth notification message carries a RLC status report that is corresponding to the secondary eNodeB and that is related to a data radio bearer DRB.

Figure 6:
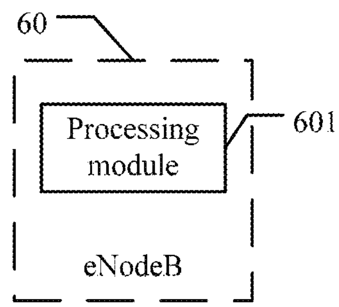
FIG. 6 is a schematic structural diagram of an eNodeB according to an aspect.

Referring to FIG. 6, an eNodeB 60 in an aspect of the present disclosure is described. The eNodeB 60 is applied to unlicensed spectrum-based radio communication, and the eNodeB 60 includes:

a processing module 601, configured to configure, for a terminal, at least one candidate secondary cell used for cross scheduling, where the at least one candidate secondary cell is configured to perform cross scheduling on an uplink radio resource of a secondary cell; and when the secondary cell is available, allocate, to the terminal, the uplink radio resource of the secondary cell by using a physical downlink control channel used by the secondary cell or a physical downlink control channel used by the candidate secondary cell; or when the secondary cell is unavailable and the candidate secondary cell is available, allocate, to the terminal, the uplink radio resource of the secondary cell by using a physical downlink control channel used by the candidate secondary cell.

In this embodiment of the present disclosure, the processing module 601 configures, for the terminal, the at least one candidate secondary cell used for cross scheduling; and when the secondary cell provided by the eNodeB is available, the eNodeB allocates, to the terminal, the uplink radio resource of the secondary cell by using the physical downlink control channel used by the secondary cell; or when the secondary cell provided by the eNodeB is unavailable, the eNodeB allocates, to the terminal, the uplink radio resource of the secondary cell by using the physical downlink control channel used by the candidate secondary cell, so as to obtain more chances for allocating an uplink radio resource to the terminal. This can improve a throughput and radio resource utilization.

Additionally or alternatively, based on the embodiment corresponding to FIG. 6, in a first optional embodiment of this embodiment of the present disclosure, the processing module 601 is further configured to:

configure a priority for each candidate secondary cell, where a priority of the secondary cell is higher than the priority of each candidate secondary cell, or a priority of the secondary cell is lower than a priority of the at least one candidate secondary cell.

The processing module 601 is specifically configured to:

when the secondary cell is unavailable, select, in descending order of priorities of candidate secondary cells, a target candidate secondary cell with a highest priority from candidate secondary cells whose current radio resources are available, and allocate, to the terminal, the uplink radio resource of the secondary cell by using a physical downlink control channel used by the target candidate secondary cell.

Additionally or alternatively, based on the first optional embodiment, in a second optional embodiment of this embodiment of the present disclosure, the eNodeB 60 further includes:

a transmission module 602, configured to send an indication message to the terminal, where the indication message is configured to indicate whether the secondary cell is in an available state, so that the terminal monitors, in a secondary cell in an available state according to the indication message and the priority order, the physical downlink control channel that is configured to allocate the uplink radio resource of the secondary cell.

Figure 7A:
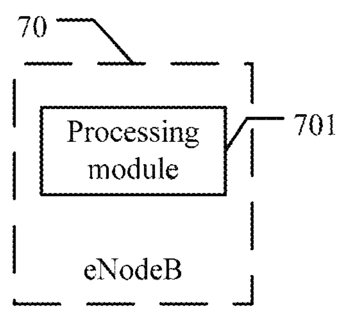
FIG. 7A is another schematic structural diagram of an eNodeB according to an aspect.

Referring to FIG. 7A, the following describes an eNodeB 70 in an aspect of the present disclosure. The eNodeB 70 is applied to unlicensed spectrum-based radio communication, and the eNodeB 70 includes:

a processing module 701, configured to: configure, in a secondary eNodeB, a primary secondary cell and at least one secondary cell for a terminal, so that the terminal decodes downlink data received by the primary secondary cell or any secondary cell to obtain a decoding result; and when it is determined that an uplink radio resource of the primary secondary cell or the secondary cell is available, send a first message to the eNodeB by using the primary secondary cell or the secondary cell, or when it is determined that an uplink radio resource of the primary secondary cell or the secondary cell is unavailable, send the first message to the eNodeB by using any secondary cell, different from the unavailable secondary cell, of the at least one secondary cell; and determine, according to the first message, whether to retransmit the downlink data or send new downlink data.

In this embodiment of the present disclosure, the processing module 701 configures the primary secondary cell and the at least one secondary cell for the terminal, so that the terminal decodes the downlink data received by the primary secondary cell; and when the uplink radio resource of the secondary cell is available, sends the first message to the eNodeB by using the secondary cell; or when the uplink radio resource of the secondary cell is unavailable, sends the first message to the eNodeB by using another available secondary cell. This can effectively avoid the following problem: When an unlicensed spectrum is used in the prior art, the eNodeB has not received, for a long time, the first message fed back by the terminal because an uplink radio resource of the secondary cell is unavailable, and therefore the eNodeB cannot determine whether to perform retransmission or to transmit new data.

Additionally or alternatively, based on the embodiment corresponding to FIG. 7A, in a first optional embodiment of this embodiment of the present disclosure, when there are a plurality of secondary cells, the processing module 701 is further configured to:

configure priorities for the primary secondary cell and each secondary cell, so that the terminal selects, in descending order of the priorities of the primary secondary cell and the secondary cell, a cell with a highest priority from the primary secondary cell or the secondary cell whose current radio resource is available, to send the first message.

Additionally or alternatively, based on the first optional embodiment, in a second optional embodiment of this embodiment of the present disclosure, the priority configured for the secondary cell of the terminal by the processing module 701 meets one of the following cases:

the processing module 701 configures a same primary secondary cell and a plurality of secondary cells for different terminals, where a same priority is configured for the secondary cells of the different terminals;

the processing module 701 configures a same primary secondary cell and a plurality of secondary cells for different terminals, where different priorities are configured for the secondary cells of the different terminals;

the processing module 701 configures different primary secondary cells and a plurality of secondary cells for different terminals, where a same priority is configured for the secondary cells of the different terminals; or the processing module 701 configures different primary secondary cells and a plurality of secondary cells for different terminals, where different priorities are configured for the secondary cells of the different terminals.

Figure 7B:
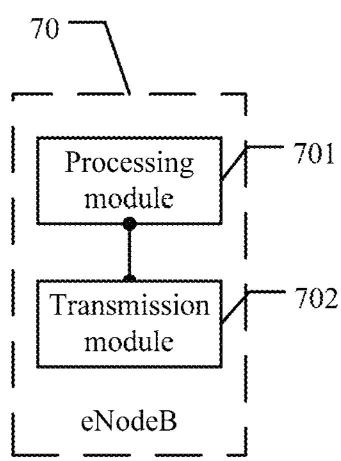
FIG. 7B is another schematic structural diagram of an eNodeB according to an aspect.

Additionally or alternatively, based on the embodiment corresponding to FIG. 7A or the first or the second optional embodiment, referring to FIG. 7B, in a third optional embodiment of this embodiment of the present disclosure, the eNodeB 70 further includes:

a transmission module 702, configured to receive the first message on a physical uplink control channel PUCCH or a physical uplink shared channel PUSCH corresponding to a physical downlink shared channel PDSCH on which the downlink data is sent; or when the first message is not detected on a radio resource, sequentially detect the first message in descending order of priorities of candidate secondary cells; or when the first message is a message that is sent by the transmission module 702 by using a channel used by a candidate secondary cell, detect, according to a processing mode of carrier aggregation CA, a channel on which the first message is sent.

Figure 8:
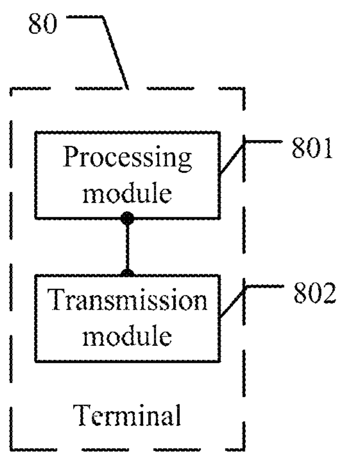
FIG. 8 is another schematic structural diagram of a terminal according to an aspect.

Referring to FIG. 8, a terminal 80 in an aspect of the present disclosure is described. The terminal 80 is applied to unlicensed spectrum-based radio communication, and the terminal 80 includes:

a processing module 801, configured to: receive downlink data in a primary secondary cell, and decode the downlink data to obtain a decoding result; and a transmission module 802, configured to: send a first message to an eNodeB in a first time period according to the decoding result obtained by the processing module 801, so that the eNodeB determines, according to the first message, whether to retransmit the downlink data or send new downlink data, where when the decoding result indicates that decoding succeeds, the first message includes an acknowledgement ACK message, or when the decoding result indicates that decoding fails, the first message includes an NACK message, and the first time period includes one of the following:

a protocol-predefined short interval, a $1^{st}$ first uplink OFDM symbol that is not occupied, a first uplink subframe, or a $1^{st}$ second uplink subframe that is not occupied and that follows the first uplink subframe, where the $1^{st}$ first uplink OFDM symbol, the first uplink subframe, and the $1^{st}$ second uplink subframe are used for receiving the downlink data in an LTE system, and a subframe in which the terminal receives the downlink data and the protocol-predefined short interval are in a same subframe, and the first uplink subframe is in the first downlink subframe following the downlink subframe in which the terminal receives the data.

In this embodiment of the present disclosure, after the processing module 801 decodes the downlink data received by the primary secondary cell, the transmission module 802 sends the first message to the eNodeB in the first time period according to the decoding result. This can effectively avoid the following problem: When an unlicensed spectrum is used in the prior art, the first message cannot be fed back in a timely manner because a feedback time period is relatively long and is a fixed configuration, and in this case, because the eNodeB has not received a feedback from the terminal for a long time, the eNodeB cannot determine whether to perform retransmission or transmit new data.

Additionally or alternatively, based on the embodiment corresponding to FIG. 8, in a first optional embodiment of this embodiment of the present disclosure, the first message is a signaling message that is sent to the eNodeB by the transmission module 802 in the first time period by using any one of the following:

a physical uplink control channel PUCCH of the primary secondary cell or a physical uplink shared channel PUSCH of the primary secondary cell; or the first message is a signaling message that is sent by the transmission module 802 in descending order of priorities of candidate secondary cells by using a candidate secondary cell with a highest priority from candidate secondary cells whose current radio resources are available.

Additionally or alternatively, based on the embodiment corresponding to FIG. 8 or the first optional embodiment, in a second optional embodiment of this embodiment of the present disclosure, before the first time period, the transmission module 802 is further configured to:

send a reference signal to the eNodeB or send a MAC layer data packet including a channel reservation time to the eNodeB, to occupy the PUCCH or the PUSCH, so as to reach maximum channel occupancy duration.

The present disclosure further provides a computer storage medium. The medium stores a program, and when the program is executed, some or all of the steps in the radio resource scheduling method are performed.

The present disclosure further provides a computer storage medium. The medium stores a program, and when the program is executed, some or all of the steps in the radio resource scheduling method executed by the eNodeB or the terminal are performed.

Figure 9:
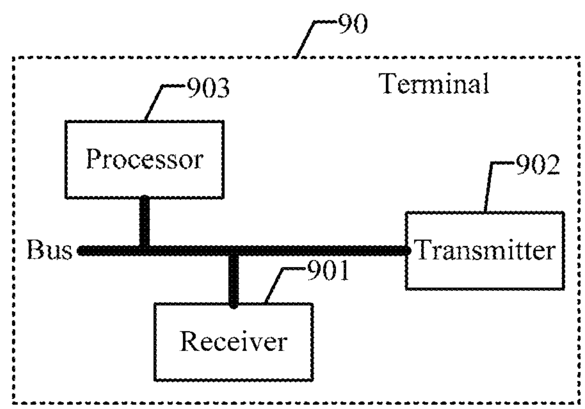
FIG. 9 is another schematic structural diagram of a terminal according to an aspect.

FIG. 9 is another schematic structural diagram of a terminal 90 according to an aspect of the present disclosure. The terminal 90 may include at least one network interface or another communications interface, at least one receiver 901, at least one transmitter 902, at least one processor 903, and a memory 904, so as to implement a connection and communication between these apparatuses. The at least one network interface (wired or wireless) may be used for implementing a communication connection between the system gateway and at least another network element, where the Internet, a wide area network, a local network, a metropolitan area network, or the like may be used.

The memory 904 may include a read-only memory and a random access memory, and provide an instruction and data to the processor 903. A part of the memory 904 may further include a high-speed random access memory (RAM), or may further include a non-volatile memory.

The memory 904 stores the following elements: an executable module or a data structure, or a subset thereof, or an extended set thereof:

operation instructions, including various operation instructions and configured to implement various operations; and an operating system, including various system programs and configured to implement various basic services and process hardware-based tasks.

In this embodiment of the present disclosure, the processor 903 invokes the operation instructions (the operation instructions may be stored in the operating system) stored in the memory 904, to execute the following operations:

determining a channel status of a channel according to at least one of first status information that is of the channel and that is indicated by a secondary eNodeB or second status information that is of the channel and that is obtained by the terminal 90; and sending, to a master eNodeB by using the transmitter 902, a first notification message configured to indicate the channel status that is determined by the processor 903, so that the master eNodeB performs radio resource scheduling for the terminal according to the first notification message.

Additionally or alternatively, the first notification message is further configured to indicate first duration of channel occupancy and/or second duration of channel releasing, so that the master eNodeB allocates a radio resource to the terminal 90 within the first duration and/or the second duration according to the first duration and/or the second duration; or the first notification message is further configured to indicate whether the channel is occupied and whether the channel is released, so that the master eNodeB allocates a radio resource to the terminal 90 according to an indication of the first notification message before receiving a next notification message that is sent by the terminal 90.

In some implementations, the processor 903 may further perform the following steps:

when a channel used by a PSCell is occupied by LTE, the terminal receives downlink data that is sent by the secondary eNodeB according to the limit information allocated by the secondary eNodeB and/or the terminal sends uplink data to the secondary eNodeB according to limit information allocated by the secondary eNodeB, and the master eNodeB allocates a radio resource to the terminal according to the limit information allocated by the master eNodeB; and when a channel used by a primary secondary cell is not occupied by LTE, the terminal cannot receive downlink data that is sent by the secondary eNodeB, and/or the terminal cannot send uplink data to the secondary eNodeB, where all capabilities corresponding to a capability parameter of the terminal are used by the master eNodeB to perform scheduling for the terminal.

The capability parameter of the terminal includes limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, where the limit information is allocated by the master eNodeB and the secondary eNodeB.

In some implementations, the processor 903 may further perform the following steps:

sending first uplink data to the master eNodeB according to a first power by using the transmitter 902, where the first power is a power limit that is configured by the master eNodeB for the terminal 90 to send the first uplink data; and/or sending second uplink data to the secondary eNodeB according to a second power, where the second power is a power limit that is configured by the secondary eNodeB for the terminal 90 to send the second uplink data, and a sum of the first power and the second power is not greater than a maximum transmit power of the terminal; and after the transmitter 902 sends the first uplink data or the second uplink data, and when it is determined, according to the first power and the second power, that there is a residual power, sending, according to the residual power, third uplink data to the secondary eNodeB by using the transmitter 902; or sending a second notification message to the master eNodeB by using the transmitter 902, where the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal 90 according to the residual power.

In some implementations, the processor 903 may further perform at least one of the following steps:

when it is determined that an uplink radio resource of the primary secondary cell is unavailable, sending a third notification message to the master eNodeB by using the transmitter 902, so that the master eNodeB forwards, to the secondary eNodeB, content carried in the third notification message, and the secondary eNodeB performs radio resource scheduling for the terminal, where the third notification message carries a buffer status report BSR and a power headroom report PHR that are related to the secondary eNodeB; or when it is determined that an uplink radio resource of the primary secondary cell is unavailable, sending a fifth notification message to the master eNodeB by using the transmitter 902, so that the master eNodeB forwards, to the secondary eNodeB, content carried in the fifth notification message, and the secondary eNodeB performs radio resource scheduling for the terminal 90, where the fifth notification message carries a RLC status report that is corresponding to the secondary eNodeB and that is related to a data radio bearer DRB.

Figure 10:
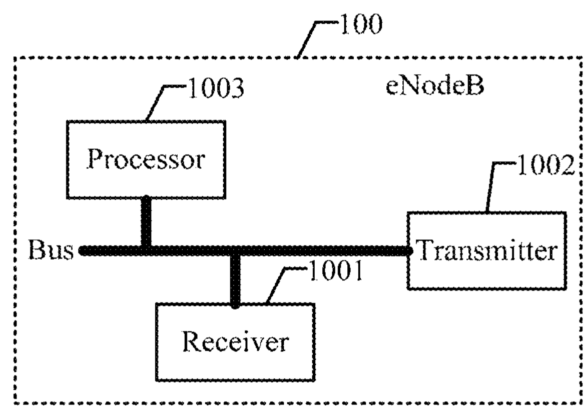
FIG. 10 is another schematic structural diagram of an eNodeB according to an aspect.

FIG. 10 is another schematic structural diagram of an eNodeB 100 according to an aspect of the present disclosure. The eNodeB 100 may include at least one network interface or another communications interface, at least one receiver 1001, at least one transmitter 1002, at least one processor 1003, and a memory 1004, so as to implement a connection and communication between these apparatuses. The at least one network interface (wired or wireless) may be used for implementing a communication connection between the system gateway and at least another network element, where the Internet, a wide area network, a local network, a metropolitan area network, or the like may be used.

The memory 1004 may include a read-only memory and a random access memory, and provide an instruction and data to the processor 1003. A part of the memory 1004 may further include a high-speed random access memory (RAM, Random Access Memory), or may further include a non-volatile memory (non-volatile memory).

The memory 1004 stores the following elements: an executable module or a data structure, or a subset thereof, or an extended set thereof:

operation instructions, including various operation instructions and configured to implement various operations; and an operating system, including various system programs and configured to implement various basic services and process hardware-based tasks.

In this embodiment of the present disclosure, the processor 1003 invokes the operation instructions (the operation instructions may be stored in the operating system) stored in the memory 1004, to execute the following operations:

configuring, for a terminal, at least one candidate secondary cell used for cross scheduling, where the at least one candidate secondary cell is configured to perform cross scheduling on an uplink radio resource of a secondary cell; and when the secondary cell is available, allocating, to the terminal, the uplink radio resource of the secondary cell by using a physical downlink control channel used by the secondary cell or a physical downlink control channel used by the candidate secondary cell; or when the secondary cell is unavailable and the candidate secondary cell is available, allocating, to the terminal, the uplink radio resource of the secondary cell by using a physical downlink control channel used by the candidate secondary cell.

In some implementations, the processor 1003 may further perform the following steps:

configuring a priority for each candidate secondary cell, where a priority of the secondary cell is higher than the priority of each candidate secondary cell, or a priority of the secondary cell is lower than a priority of the at least one candidate secondary cell; and when the secondary cell is unavailable, selecting, in descending order of priorities of candidate secondary cells, a target candidate secondary cell with a highest priority from candidate secondary cells whose current radio resources are available, and allocating, to the terminal, the uplink radio resource of the secondary cell by using a physical downlink control channel used by the target candidate secondary cell.

In some implementations, the processor 1003 may further perform the following step:

sending an indication message to the terminal by using the transmitter 1002, where the indication message is configured to indicate whether the secondary cell is in an available state, so that the terminal monitors, in a secondary cell in an available state according to the indication message and the priority order, the physical downlink control channel that is configured to allocate the uplink radio resource of the secondary cell.

Figure 11:
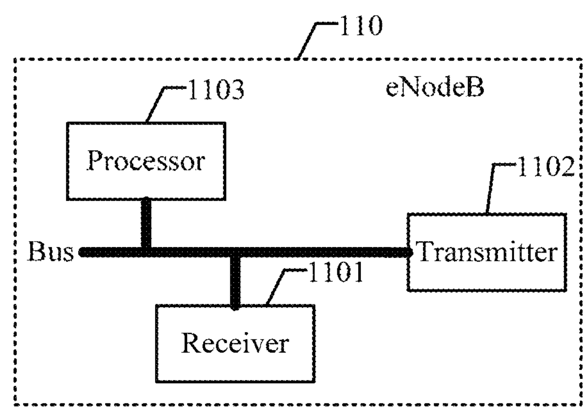
FIG. 11 is another schematic structural diagram of an eNodeB according to an aspect.

FIG. 11 is another schematic structural diagram of an eNodeB 110 according to an aspect of the present disclosure. The eNodeB 110 may include at least one network interface or another communications interface, at least one receiver 1101, at least one transmitter 1102, at least one processor 1103, and a memory 1104, so as to implement a connection and communication between these apparatuses. The at least one network interface (wired or wireless) may be used for implementing a communication connection between the system gateway and at least another network element, where the Internet, a wide area network, a local network, a metropolitan area network, or the like may be used.

The memory 1104 may include a read-only memory and a random access memory, and provide an instruction and data to the processor 1103. A part of the memory 1104 may further include a high-speed random access memory (RAM), or may further include a non-volatile memory.

The memory 1104 stores the following elements: an executable module or a data structure, or a subset thereof, or an extended set thereof:

operation instructions, including various operation instructions and configured to implement various operations; and an operating system, including various system programs and configured to implement various basic services and process hardware-based tasks.

In this embodiment of the present disclosure, the processor 1103 invokes the operation instructions (the operation instructions may be stored in the operating system) stored in the memory 1104, to execute the following operations:

configuring, in a secondary eNodeB, a primary secondary cell and at least one secondary cell for a terminal, so that the terminal decodes downlink data received by the primary secondary cell or any secondary cell to obtain a decoding result, and when it is determined that an uplink radio resource of the primary secondary cell or the secondary cell is available, sending a first message to the eNodeB by using the primary secondary cell or the secondary cell, or when it is determined that an uplink radio resource of the primary secondary cell or the secondary cell is unavailable, sending the first message to the eNodeB by using any secondary cell, different from the unavailable secondary cell, of the at least one secondary cell; and determining, according to the first message, whether to retransmit the downlink data or send new downlink data. In some implementations, the processor 1103 may further perform the following step:

configuring priorities for the primary secondary cell and each secondary cell, where the primary secondary cell has a highest priority, so that the terminal selects, in descending order of the priorities of the primary secondary cell and the secondary cell, a cell with a highest priority from the primary secondary cell or the secondary cell whose current radio resource is available, to send the first message.

In some implementations, the processor 1103 may further perform one of the following steps:

configuring a same primary secondary cell and a plurality of secondary cells for different terminals, where a same priority is configured for the secondary cells of the different terminals;

configuring a same primary secondary cell and a plurality of secondary cells for different terminals, where different priorities are configured for the secondary cells of the different terminals;

configuring different primary secondary cells and a plurality of secondary cells for different terminals, where a same priority is configured for the secondary cells of the different terminals; or configuring different primary secondary cells and a plurality of secondary cells for different terminals, where different priorities are configured for the secondary cells of the different terminals.

In some implementations, the processor 1103 may further perform one of the following steps:

receiving, by using the receiver 1101, the first message on a physical uplink control channel PUCCH or a physical uplink shared channel PUSCH corresponding to a physical downlink shared channel PDSCH on which the downlink data is sent; or when the first message is not detected on a radio resource, sequentially detecting the first message in descending order of priorities of candidate secondary cells by using the receiver 1101; or when the first message is a message that is sent by the transmitter 702 by using a channel used by a candidate secondary cell, detecting, by using the receiver 1101 and according to a processing mode of carrier aggregation CA, a channel on which the first message is sent.

Figure 12:
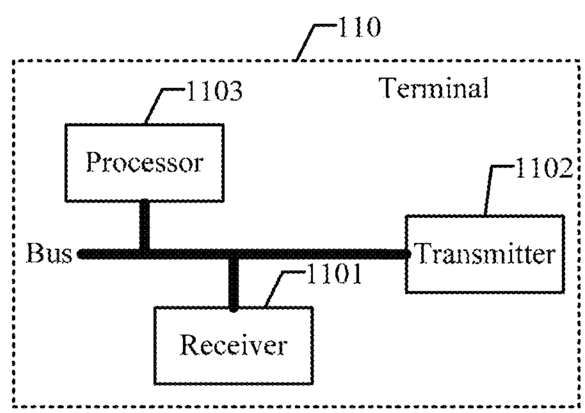
FIG. 12 is another schematic structural diagram of a terminal according to an aspect.

FIG. 12 is another schematic structural diagram of a terminal 120 according to an aspect of the present disclosure. The terminal 120 may include at least one network interface or another communications interface, at least one receiver 1201, at least one transmitter 1202, at least one processor 1203, and a memory 1204, so as to implement a connection and communication between these apparatuses. The at least one network interface (wired or wireless) may be used for implementing a communication connection between the system gateway and at least another network element, where the Internet, a wide area network, a local network, a metropolitan area network, or the like may be used.

The memory 1204 may include a read-only memory and a random access memory, and provide an instruction and data to the processor 1203. A part of the memory 1204 may further include a high-speed random access memory (RAM), or may further include a non-volatile memory.

The memory 1204 stores the following elements: an executable module or a data structure, or a subset thereof, or an extended set thereof:

operation instructions, including various operation instructions and configured to implement various operations; and an operating system, including various system programs and configured to implement various basic services and process hardware-based tasks.

In this embodiment of the present disclosure, the processor 1203 invokes the operation instructions (the operation instructions may be stored in the operating system) stored in the memory 1204, to execute the following operations:

receiving downlink data in a primary secondary cell, decoding the downlink data to obtain a decoding result; and sending, by using the transmitter 1202, a first message to an eNodeB in a first time period according to the decoding result obtained by the processor 1203, so that the eNodeB determines, according to the first message, whether to retransmit the downlink data or send new downlink data, where when the decoding result indicates that decoding succeeds, the first message includes an acknowledgement ACK message, or when the decoding result indicates that decoding fails, the first message includes an NACK message, and the first time period includes one of the following:

a protocol-predefined short interval, a $1^{st}$ first uplink OFDM symbol that is not occupied, a first uplink subframe, or a $1^{st}$ second uplink subframe that is not occupied and that follows the first uplink subframe, where the $1^{st}$ first uplink OFDM symbol, the first uplink subframe, and the $1^{st}$ second uplink subframe are used for receiving the downlink data in an LTE system, and a subframe in which the terminal receives the downlink data and the protocol-predefined short interval are in a same subframe, and the first uplink subframe is in the first downlink subframe following the downlink subframe in which the terminal receives the data.

Additionally or alternatively, the first message is a signaling message that is sent to the eNodeB by the transmission module 802 in the first time period by using any one of the following:

a physical uplink control channel PUCCH of the primary secondary cell or a physical uplink shared channel PUSCH of the primary secondary cell; or the first message is a signaling message that is sent by the transmitter 1202 in descending order of priorities of candidate secondary cells by using a candidate secondary cell with a highest priority from candidate secondary cells whose current radio resources are available.

In some implementations, before the first time period, the processor 1203 may further perform the following step:

sending a reference signal to the eNodeB by using the transmitter 1202 or sending, by using the transmitter 1202, a MAC layer data packet including a channel reservation time to the eNodeB, to occupy the PUCCH or the PUSCH, so as to reach maximum channel occupancy duration.

With reference to the first aspect, in a first implementation of the first aspect of the present disclosure, the first notification message is further configured to indicate first duration of channel occupancy and/or second duration of channel releasing, so that the master eNodeB allocates a radio resource to the terminal within the first duration and/or the second duration according to the first duration and/or the second duration; or the first notification message is further configured to indicate whether the channel is occupied and whether the channel is released, so that the master eNodeB allocates a radio resource to the terminal according to an indication of the first notification message before receiving a next notification message that is sent by the terminal.

With reference to the first aspect or the first implementation of the first aspect, in a second implementation of the first aspect of the present disclosure, the method further includes:

sending, by the terminal, first uplink data to the master eNodeB according to a first power, where the first power is a power limit that is configured by the master eNodeB for the terminal to send the first uplink data; and/or sending, by the terminal, second uplink data to the secondary eNodeB according to a second power, where the second power is a power limit that is configured by the secondary eNodeB for the terminal to send the second uplink data, and a sum of the first power and the second power is not greater than a maximum transmit power of the terminal; and the method further includes:

sending, by the terminal, third uplink data according to a third power or sending fourth uplink data according to a fourth power; when the third power is a residual power that is determined according to the first power and the second power, sending, by the terminal, the third uplink data to the master eNodeB according to the first power and a part of or all of the residual power; and when the fourth power is a residual power that is determined according to the first power and the second power, sending, by the terminal, the fourth uplink data to the secondary eNodeB according to the second power and a part of or all of the residual power; or sending, by the terminal, a second notification message to the master eNodeB, where the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal according to the first power, or the first power and the residual power.

With reference to the second implementation of the first aspect, in a third implementation of the first aspect of the present disclosure, a capability parameter of the terminal includes limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, where the limit information is allocated by the master eNodeB and the secondary eNodeB; and the method further includes one of the following cases:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, where all capabilities corresponding to the capability parameter of the terminal are used by the master eNodeB to perform scheduling for the terminal.

With reference to any one of the first aspect or the first to the third implementations of the first aspect, in a fourth implementation of the first aspect of the present disclosure, the method further includes at least one of the following steps:

when it is determined that an uplink radio resource of the primary secondary cell is unavailable, sending, by the terminal, a third notification message to the master eNodeB, so that the master eNodeB forwards, to the secondary eNodeB, content carried in the third notification message, and the secondary eNodeB performs radio resource scheduling for the terminal, where the third notification message carries a buffer status report BSR and a power headroom report PHR that are related to the secondary eNodeB; or when it is determined that an uplink radio resource of the primary secondary cell is unavailable, sending, by the terminal, a fifth notification message to the master eNodeB, so that the master eNodeB forwards, to the secondary eNodeB, content carried in the fifth notification message, and the secondary eNodeB performs radio resource scheduling for the terminal, where the fifth notification message carries a RLC status report that is corresponding to the secondary eNodeB and that is related to a data radio bearer DRB.

With reference to the second aspect, in a first implementation of the second aspect of the present disclosure, the method further includes:

configuring, by the eNodeB, a priority for each candidate secondary cell, where a priority of the secondary cell is higher than the priority of each candidate secondary cell, or a priority of the secondary cell is lower than a priority of the at least one candidate secondary cell; and the allocating, by the eNodeB to the terminal, the uplink radio resource of the secondary cell by using a physical downlink control channel used by the candidate secondary cell, when the secondary cell is unavailable, includes:

when the secondary cell is unavailable, selecting, by the eNodeB in descending order of priorities of candidate secondary cells, a target candidate secondary cell with a highest priority from candidate secondary cells whose current radio resources are available, and allocating, to the terminal, the uplink radio resource of the secondary cell by using a physical downlink control channel used by the target candidate secondary cell.

Additionally or alternatively, the allocating, by the eNodeB to the terminal, the uplink radio resource of the secondary cell by using a physical downlink control channel used by the secondary cell, when the secondary cell is available, includes:

allocating, by the eNodeB to the terminal, the uplink radio resource of the secondary cell by using the physical downlink control channel used by the secondary cell, so that the terminal sends uplink data on a physical uplink shared control channel by using the uplink radio resource.

With reference to the first implementation of the second aspect, in a second implementation of the second aspect of the present disclosure, the method further includes:

sending, by the eNodeB, an indication message to the terminal, where the indication message is configured to indicate whether the secondary cell is in an available state, so that the terminal monitors, in a secondary cell in an available state according to the indication message and the priority order, the physical downlink control channel that is configured to allocate the uplink radio resource of the secondary cell.

With reference to the third aspect, in a first implementation of the third aspect of the present disclosure, when there are a plurality of candidate secondary cells, the method further includes:

configuring, by the eNodeB, priorities for the primary secondary cell and each secondary cell, where the primary secondary cell has a highest priority, so that the terminal selects, in descending order of the priorities of the primary secondary cell and the secondary cell, a cell with a highest priority from the primary secondary cell or the secondary cell whose current radio resource is available, to send the first message.

With reference to the third aspect or the first implementation of the third aspect, in a second implementation of the third aspect of the present disclosure, the method further includes one of the following cases:

the eNodeB configures a same primary secondary cell and a plurality of secondary cells for different terminals, where a same priority is configured for the secondary cells of the different terminals;

the eNodeB configures a same primary secondary cell and a plurality of secondary cells for different terminals, where different priorities are configured for the secondary cells of the different terminals;

the eNodeB configures different primary secondary cells and a plurality of secondary cells for different terminals, where a same priority is configured for the secondary cells of the different terminals; or the eNodeB configures different primary secondary cells and a plurality of secondary cells for different terminals, where different priorities are configured for the secondary cells of the different terminals.

With reference to the third aspect or the first implementation or the second implementation of the third aspect, in a third implementation of the third aspect of the present disclosure, the method further includes:

receiving, by the eNodeB, the first message on a physical uplink control channel PUCCH or a physical uplink shared channel PUSCH corresponding to a physical downlink shared channel PDSCH on which the downlink data is sent; or when the first message is not detected on a radio resource, sequentially detecting, by the eNodeB, the first message in descending order of priorities of candidate secondary cells; or when the first message is a message that is sent by the terminal by using a channel used by a candidate secondary cell, detecting, by the eNodeB according to a processing mode of carrier aggregation CA, a channel on which the first message is sent.

With reference to the fourth aspect, in a first implementation of the fourth aspect of the present disclosure, the first message is a signaling message that is sent to the eNodeB by the terminal in the first time period by using any one of the following:

a physical uplink control channel PUCCH of the primary secondary cell or a physical uplink shared channel PUSCH of the primary secondary cell; or the first message is a signaling message that is sent by the terminal in descending order of priorities of candidate secondary cells by using a candidate secondary cell with a highest priority from candidate secondary cells whose current radio resources are available. Additionally or alternatively, the priorities of the candidate secondary cells are configured by the eNodeB for the terminal.

With reference to the first implementation of the fourth aspect, in a second implementation of the fourth aspect of the present disclosure, before the first time period, the method further includes:

sending, by the terminal, a reference signal to the eNodeB or sending a MAC layer data packet including a channel reservation time to the eNodeB, to occupy the PUCCH or the PUSCH, so as to reach maximum channel occupancy duration.

With reference to the fourth aspect or the first implementation or the second implementation of the fourth aspect, in a third implementation of the fourth aspect of the present disclosure, after the maximum channel occupancy duration expires or when an uplink radio resource of the secondary cell or a radio resource occupied by the terminal is unavailable, when the terminal has not yet sent the first message to the eNodeB, the method further includes:

after re-occupying the PUCCH or the PUSCH, determining, by the terminal according to maximum duration for sending the first message, whether to send the first message again.

With reference to the fifth aspect, in a first implementation of the fifth aspect of the present disclosure, the first notification message is further configured to indicate first duration of channel occupancy and/or second duration of channel releasing, so that the master eNodeB allocates a radio resource to the terminal within the first duration and/or the second duration according to the first duration and/or the second duration; or the first notification message is further configured to indicate whether the channel is occupied and whether the channel is released, so that the master eNodeB allocates a radio resource to the terminal according to an indication of the first notification message before receiving a next notification message that is sent by the terminal.

With reference to the fifth aspect or the first implementation of the fifth aspect, in a second implementation of the fifth aspect of the present disclosure, the transmission module is further configured to:

send first uplink data to the master eNodeB according to a first power, where the first power is a power limit that is configured by the master eNodeB for the terminal to send the first uplink data; and/or send second uplink data to the secondary eNodeB according to a second power, where the second power is a power limit that is configured by the secondary eNodeB for the terminal to send the second uplink data, and a sum of the first power and the second power is not greater than a maximum transmit power of the terminal; and the transmission module is further configured to:

send third uplink data according to a third power or send fourth uplink data according to a fourth power; when the third power is a residual power that is determined according to the first power and the second power, send the third uplink data to the master eNodeB according to the first power and a part of or all of the residual power; and when the fourth power is a residual power that is determined according to the first power and the second power, send the fourth uplink data to the secondary eNodeB according to the second power and a part of or all of the residual power; or send a second notification message to the master eNodeB, where the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal according to the first power, or the first power and the residual power.

With reference to the second implementation of the fifth aspect, in a third implementation of the first aspect of the present disclosure, a capability parameter of the terminal includes limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, where the limit information is allocated by the master eNodeB and the secondary eNodeB; and the transmission module further executes one of the following cases:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, where all capabilities corresponding to the capability parameter of the terminal are used by the master eNodeB to perform scheduling for the terminal.

With reference to the fifth aspect or the first to the third implementations of the fifth aspect, in a fourth implementation of the fifth aspect of the present disclosure, the transmission module is further configured to perform at least one of the following steps:

when it is determined that an uplink radio resource of the primary secondary cell is unavailable, sending a third notification message to the master eNodeB, so that the master eNodeB forwards, to the secondary eNodeB, content carried in the third notification message, and the secondary eNodeB performs radio resource scheduling for the terminal, where the third notification message carries a buffer status report BSR and a power headroom report PHR that are related to the secondary eNodeB; or when it is determined that an uplink radio resource of the primary secondary cell is unavailable, sending a fifth notification message to the master eNodeB, so that the master eNodeB forwards, to the secondary eNodeB, content carried in the fifth notification message, and the secondary eNodeB performs radio resource scheduling for the terminal, where the fifth notification message carries a radio link control (RLC) status report that is corresponding to the secondary eNodeB and that is related to a data radio bearer DRB.

With reference to the sixth aspect of the present disclosure, in a first implementation of the sixth aspect of the present disclosure, the processing module is further configured to:

configure a priority for each candidate secondary cell, where a priority of the secondary cell is higher than the priority of each candidate secondary cell, or a priority of the secondary cell is lower than a priority of the at least one candidate secondary cell; and the processing module is specifically configured to:

when the secondary cell is unavailable, select, in descending order of priorities of candidate secondary cells, a target candidate secondary cell with a highest priority from candidate secondary cells whose current radio resources are available, and allocate, to the terminal, the uplink radio resource of the secondary cell by using a physical downlink control channel used by the target candidate secondary cell.

With reference to the first implementation of the sixth aspect of the present disclosure, in a second implementation of the sixth aspect of the present disclosure, the eNodeB further includes:

a transmission module, configured to send an indication message to the terminal, where the indication message is configured to indicate whether the secondary cell is in an available state, so that the terminal monitors, in a secondary cell in an available state according to the indication message and the priority order, the physical downlink control channel that is configured to allocate the uplink radio resource of the secondary cell.

With reference to the seventh aspect, in a first implementation of the seventh aspect of the present disclosure, when there are a plurality of candidate secondary cells, the processing module is further configured to:

configure priorities for the primary secondary cell and each secondary cell, where the primary secondary cell has a highest priority, so that the terminal selects, in descending order of the priorities of the primary secondary cell and the secondary cell, a cell with a highest priority from the primary secondary cell or the secondary cell whose current radio resource is available, to send the first message.

With reference to the seventh aspect or the first implementation of the seventh aspect, in a second implementation of the seventh aspect of the present disclosure, a priority configured for a candidate secondary cell of the terminal by the processing module meets one of the following cases:

the processing module configures a same primary secondary cell and a plurality of secondary cells for different terminals, where a same priority is configured for the secondary cells of the different terminals;

the processing module configures a same primary secondary cell and a plurality of secondary cells for different terminals, where different priorities are configured for the secondary cells of the different terminals;

the processing module configures different primary secondary cells and a plurality of secondary cells for different terminals, where a same priority is configured for the secondary cells of the different terminals; or the processing module configures different primary secondary cells and a plurality of secondary cells for different terminals, where different priorities are configured for the secondary cells of the different terminals.

With reference to the seventh aspect or the first or the second implementation of the seventh aspect, in a third implementation of the seventh aspect of the present disclosure, the eNodeB further includes:

a transmission module, configured to receive the first message on a physical uplink control channel PUCCH or a physical uplink shared channel PUSCH corresponding to a physical downlink shared channel PDSCH on which the downlink data is sent; or when the first message is not detected on a radio resource, sequentially detect the first message in descending order of priorities of candidate secondary cells; or when the first message is a message that is sent by the transmission module by using a channel used by the candidate secondary cell, detect, according to a processing mode of carrier aggregation CA, a channel on which the first message is sent.

With reference to the eighth aspect, in a first implementation of the eighth aspect of the present disclosure, the first message is a signaling message that is sent to the eNodeB by the transmission module in the first time period by using any one of the following:

a physical uplink control channel PUCCH of the primary secondary cell or a physical uplink shared channel PUSCH of the primary secondary cell; or the first message is a signaling message that is sent by the transmission module in descending order of priorities of candidate secondary cells by using a candidate secondary cell with a highest priority from candidate secondary cells whose current radio resources are available.

With reference to the eighth aspect or the first implementation of the eighth aspect, in a second implementation of the eighth aspect of the present disclosure, before the first time period, the transmission module is further configured to:

send a reference signal to the eNodeB or send a MAC layer data packet including a channel reservation time to the eNodeB, to occupy the PUCCH or the PUSCH, so as to reach maximum channel occupancy duration.

In the foregoing embodiments, the description of each embodiment has respective focuses. For a part that is not described in detail in an embodiment, refer to related descriptions in other embodiments.

It may be clearly understood by a person skilled in the art that, for ease of convenience and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing details the radio resource scheduling method and the related device that are provided in the present disclosure. In this specification, specific examples are configured to describe the principle and implementations of the present disclosure, and the description of the embodiments is only intended to help understand the method and the core idea of the present disclosure. In addition, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A radio resource scheduling method applied to unlicensed spectrum—based radio communication, the method comprising:

determining, by a terminal, a channel status of a channel according to at least one of first status information of the channel and second status information of the channel, wherein the first status information of the channel is indicated by a secondary eNodeB, and wherein the second status information of the channel is obtained by the terminal;

sending, by the terminal to a master eNodeB, a first notification message that indicates the channel status, so that the master eNodeB performs radio resource scheduling for the terminal according to the first notification message;

sending, by the terminal, first uplink data to the master eNodeB according to a first power, wherein the first power is a power limit that is configured by the master eNodeB for the terminal to send the first uplink data; and sending, by the terminal, second uplink data to the secondary eNodeB according to a second power, wherein the second power is a power limit that is configured by the secondary eNodeB for the terminal to send the second uplink data, wherein a sum of the first power and the second power is not greater than a maximum transmit power of the terminal.

2. The method according to claim 1, wherein the first notification message further indicates at least one of a first duration of channel occupancy and a second duration of channel releasing, so that the master eNodeB allocates a radio resource to the terminal within at least one of the first duration and the second duration according to at least one of the first duration and the second duration.

3. The method according to claim 1, wherein the first notification message further indicates whether the channel is occupied and whether the channel is released, so that the master eNodeB allocates a radio resource to the terminal according to an indication of the first notification message before receiving a next notification message that is sent by the terminal.

4. The method according to claim 1, further comprising:

sending, by the terminal, third uplink data according to a third power or sending fourth uplink data according to a fourth power; when the third power is a residual power that is determined according to the first power and the second power, sending, by the terminal, the third uplink data to the master eNodeB according to the first power and a part of or all of the residual power; and when the fourth power is a residual power that is determined according to the first power and the second power, sending, by the terminal, the fourth uplink data to the secondary eNodeB according to the second power and a part of or all of the residual power; or sending, by the terminal, a second notification message to the master eNodeB, wherein the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal according to the first power, or the first power and the residual power.

5. The method according to claim 4, wherein a capability parameter of the terminal comprises limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, wherein the limit information is allocated by the master eNodeB and the secondary eNodeB; and the method further comprises:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, wherein all capabilities corresponding to the capability parameter of the terminal are used by the master eNodeB to perform scheduling for the terminal.

6. The method according to claim 5, wherein the method further comprises at least one of the following steps:

when it is determined that an uplink radio resource of the primary secondary cell is unavailable, sending, by the terminal, a third notification message to the master eNodeB, so that the master eNodeB forwards, to the secondary eNodeB, content carried in the third notification message, and the secondary eNodeB performs radio resource scheduling for the terminal, wherein the third notification message carries a buffer status report BSR and a power headroom report PHR that are related to the secondary eNodeB; or when it is determined that an uplink radio resource of the primary secondary cell is unavailable, sending, by the terminal, a fifth notification message to the master eNodeB, so that the master eNodeB forwards, to the secondary eNodeB, content carried in the fifth notification message, and the secondary eNodeB performs radio resource scheduling for the terminal, wherein the fifth notification message carries a RLC status report that is corresponding to the secondary eNodeB and that is related to a data radio bearer DRB.

7. A terminal applied to unlicensed spectrum—based radio communication, the terminal comprising:

a processor configured to determine a channel status of a channel according to at least one of first status information of the channel and second status information of the channel, wherein the first status information of the channel is indicated by a secondary eNodeB, and wherein the second status information of the channel is obtained by the terminal; and a transmitter configured to send, to a master eNodeB, a first notification message configured to indicate the channel status determined by the processor, so that the master eNodeB performs radio resource scheduling for the terminal according to the first notification message, wherein the transmitter is further configured to:

send first uplink data to the master eNodeB according to a first power, wherein the first power is a power limit that is configured by the master eNodeB for the terminal to send the first uplink data; and send second uplink data to the secondary eNodeB according to a second power, wherein the second power is a power limit that is configured by the secondary eNodeB for the terminal to send the second uplink data, and a sum of the first power and the second power is not greater than a maximum transmit power of the terminal.

8. The terminal according to claim 7, wherein the first notification message is further configured to indicate at least one of a first duration of channel occupancy and a second duration of channel releasing, so that the master eNodeB allocates a radio resource to the terminal within at least one of the first duration and the second duration according to at least one of the first duration and the second duration; or the first notification message is further configured to indicate whether the channel is occupied and whether the channel is released, so that the master eNodeB allocates a radio resource to the terminal according to an indication of the first notification message before receiving a next notification message that is sent by the terminal.

9. The terminal according to claim 7, wherein the transmitter is further configured to:

send third uplink data according to a third power or send fourth uplink data according to a fourth power, and when the third power is a residual power that is determined according to the first power and the second power, send the third uplink data to the master eNodeB according to the first power and a part of or all of the residual power, or when the fourth power is a residual power that is determined according to the first power and the second power, send the fourth uplink data to the secondary eNodeB according to the second power and a part of or all of the residual power; or send a second notification message to the master eNodeB, wherein the second notification message is configured to indicate whether a channel used by a primary secondary cell is available, so that when determining, according to the second notification message, that the channel used by the primary secondary cell is unavailable, the master eNodeB allocates a radio resource to the terminal according to a sum of the first power, the second power, and the residual power, or when determining that the channel used by the primary secondary cell is available, the master eNodeB allocates a radio resource to the terminal according to the first power, or the first power and the residual power.

10. The terminal according to claim 9, wherein a capability parameter of the terminal comprises limit information of a maximum quantity of downlink shared channel DL-SCH transport block bits that are received in a unit transmission time interval TTI and limit information of a maximum quantity of uplink shared channel UL-SCH transport block bits that are sent in a unit transmission time interval TTI, wherein the limit information is allocated by the master eNodeB and the secondary eNodeB; and the transmitter is further configured to execute one of the following cases:

when the channel used by the PSCell is occupied by LTE, the terminal receives downlink data that is sent by the secondary eNodeB according to the limit information allocated by the secondary eNodeB and/or the terminal sends uplink data to the secondary eNodeB according to the limit information allocated by the secondary eNodeB, and the master eNodeB allocates a radio resource to the terminal according to the limit information allocated by the master eNodeB; and when the channel used by the primary secondary cell is not occupied by LTE, the terminal cannot receive downlink data that is sent by the secondary eNodeB, and/or the terminal cannot send uplink data to the secondary eNodeB, wherein all capabilities corresponding to the capability parameter of the terminal are used by the master eNodeB to perform scheduling for the terminal.

11. The terminal according to claim 7, wherein the transmitter is further configured to perform at least one of the following steps:

when it is determined that an uplink radio resource of the primary secondary cell is unavailable, sending a third notification message to the master eNodeB, so that the master eNodeB forwards, to the secondary eNodeB, content carried in the third notification message, and the secondary eNodeB performs radio resource scheduling for the terminal, wherein the third notification message carries a buffer status report BSR and a power headroom report PHR that are related to the secondary eNodeB; or when it is determined that an uplink radio resource of the primary secondary cell is unavailable, sending a fifth notification message to the master eNodeB, so that the master eNodeB forwards, to the secondary eNodeB, content carried in the fifth notification message, and the secondary eNodeB performs radio resource scheduling for the terminal, wherein the fifth notification message carries a RLC status report that is corresponding to the secondary eNodeB and that is related to a data radio bearer DRB.

* * * * *